United States Patent Office 3,053,871
Patented Sept. 11, 1962

3,053,871
ORGANIC REDUCTION METHOD
Robert S. Aries, 77 South St., Stamford, Conn.
No Drawing. Filed Nov. 25, 1957, Ser. No. 698,370
15 Claims. (Cl. 260—448)

This invention relates to a novel process for the preparation of organo-derivatives of metals and nonmetals of the type $M(R)_n$ where R is a hydrocarbon radical, M is an element selected from the group consisting of metals and nonmetals which form hydrocarbon compounds and $n$ is the valence of M. More particularly, the invention concerns a process for the preparation of such organo derivatives by conversion of the corresponding oxygen-linked derivatives $M(OR)_n$.

The present invention provides a new and more efficient method for the preparation of many known organo-metallic compounds, and further makes possible the preparation of many new organometallic derivatives not heretofore obtainable. Among the known compounds which may be more readily prepared by the new method of this invention are metal alkyls, metal aryls, silanes, arsines, stibines, and phosphines and borines. Many of these compounds are known to be useful as antiknock agents, polymerization catalysts, fireproofing ingredients, and the like. Known methods of preparing metal alkyls, for example, by reaction of sodium compounds of metals with organic halides, possess the disadvantage of being batch methods, and of requiring the use of hazardous materials and operating conditions. The present invention provides a process which avoids the disadvantages of hazardous materials and conditions, and which is readily adaptable to continuous operation if desired.

In accordance with the present invention it has been found that organo-metallic compounds and organo derivatives of nonmetals of the general type $M(R)_n$ wherein M represents a metal or a nonmetal, R is a hydrocarbon radical substituted or unsubstituted, and $n$ is an integer representing the valence of M may be produced by a direct and simple process, starting from the corresponding oxygen-linked derivatives $M(OR)_n$ in which M, R, and $n$ have the significance mentioned previously.

The oxygen-linked derivatives of the metals which serve as starting materials will generally be organo-oxides of metals capable of forming such derivatives. Such organo-oxides include, for example, alcoholates or alkoxides, aryloxides, and the like, the number of alcoholate groups present depending upon the valence state of the metal. The organo-oxides which may be used as starting materials also include mixed derivatives, of the formula $M(OR_1)(OR_2)(OR_3) \ldots (OR_m)$, in which $R_1$, $R_2$, and $R_3$ represent at least two different hydrocarbon radicals, and $m$ represents the number of valence bonds not in combination with $R_1$, $R_2$, or $R_3$. Where M is a nonmetallic element, the starting material $M(OR)_n$ will generally be an organic ester of an acid formed by the nonmetal, or a combination of an organic hydrocarbon radical with the corresponding anhydride or nonmetal oxide.

The process of the present invention comprises the intermediate conversion of the starting material $M(OR)_n$, such as an alkoxide or ester, to a nitrogen containing derivative of the metal or nonmetal, which is then reduced to the product $M(R)_n$ by means of a suitable reducing agent. The novel reaction is one of general and wide applicability. It is in effect a reduction reaction in that the net result is the conversion of the group —OR to the group —R. Moreover, the first stage of the process serves as a novel method of preparing organic nitrogen derivatives of metals and nonmetals. The second stage of the process serves as a novel method of converting the said nitrogen derivatives to type $M(R)_n$ organo derivatives of metals and nonmetals, with simultaneous production of valuable co-products and by-products. Moreover, the novel process of this invention may be operated continuously without isolation of the intermediate organic nitrogen containing derivative of the metal or nonmetal, and with reduction of the latter to the final hydrocarbon derivative in situ, with subsequent recovery thereof from the reaction mixture.

In the first stage of the production of organo derivatives of metals or nonmetals, or of the intermediate nitrogen containing derivatives, in accordance with my novel process, the starting material of the formula $M(OR)_n$, as defined above, is treated with an organic isocyanate until evolution of carbon dioxide ceases, in accordance with the equation:

$$M(OR)_n + nR'NCO = M(NRR')_n + nCO_2 \qquad (1)$$

The organic isocyanate may be either a monoisocyanate of the formula $R'NCO$, or a polyisocyanate of the formula $R'(NCO)_y$, where R' is an organic radical, such as an aryl, cycloalkyl, or alkyl radical. Carbon dioxide is formed as a by-product.

Where an organic monoisocyanate is reacted with the starting material as indicated in the preceding equation, an intermediate mono- or polyamide substituted derivative of the metal is formed, while in the case of the nonmetal, a substituted mono- or polyamino derivative is formed.

When an organic polyisocyanate, such as, for example, a di-isocyanate is reacted with the starting material, the reaction may take the form:

$$2mM(OR)_3 + 3mR'(NCO)_2 =$$
$$mM_2(NR'N)_3R_6 + 6mCO_2 \qquad (2)$$

which corresponds in principle to Equation 1. In this reaction the intermediate nitrogen derivative may often be polymeric in character, in which case $m$ becomes an integer corresponding to the degree of polymerization of said polymer.

Where the isocyanate used is a polyisocyanate the amide formed will, because of the polyfunctionality of the isocyanate, tend to be a linear or branched polymer, where monovalent MOR type compounds are used as starting materials. However, where the starting material is a compound of the type $M(OR)_n$, where $n$ is an integer larger than 1, there will be a tendency to form a polymer which in general is geometrically a planar or nonplanar highly branched and cross-linked polymer.

In the second stage of the process, the nitrogen containing organic intermediate, whether monomeric or polymeric in character, is treated with a reducing agent suitable for the removal of the organic amino or amido or other nitrogen containing groups, resulting in regeneration of an organic isocyanate, and in conversion of the nitrogen intermediate compound to the organo derivative of the metal or nonmetal. As a reducing agent of this type I have found carbon monoxide to be most suitable. The reduction reaction utilizing carbon monoxide does not require a catalyst and proceeds smoothly in accordance with the equations:

$$MNRR' + CO = MR + R'NCO \qquad (3)$$

or $$M(NRR')_n + nCO = MR_n + nR'NCO \qquad (4)$$

where the intermediate nitrogen compound resulted from the initial use of a monoisocyanate. The reduction reaction may be represented by the equation $$mM_2(NR'N)_3R_6 + 6mCO =$$
$$3mR'(NCO)_2 + 2mM(R)_3 \qquad (5)$$

where the intermediate (and polymeric) nitrogen compound resulted from the employment of a polyisocyanate, such as a di-isocyanate.

The organic isocyanate is regenerated in each case, and may be maintained or recycled in the reaction system. The intermediate nitrogen compound may be separated and then treated with carbon monoxide, or it may be treated in situ in the reaction mixture.

The process lends itself to continuous operation, with the starting material reacted, for example, with a slight excess of stoichiometric requirements of the organic isocyanate, the intermediate nitrogen compound formed remaining in situ, carbon dioxide being removed from the system, and carbon monoxide being supplied to maintain the reducing step.

As starting materials for carrying out my novel process, I can make use generally of oxygen-linked organo derivatives of metals or nonmetals of the formula $M(OR)_n$ as indicated above. Compounds of this type include alkoxides or aryloxides or aralkoxides of metals, in which the alkyl, aryl, or aralkyl groups may be unsubstituted or substituted. Examples of such metal derivatives include alkoxides, such as methoxides or ethoxides, or propoxides or isopropoxides of aluminum, beryllium, bismuth, cadmium, germanium, magnesium, titanium, tin, zinc, tellurium, thallium, mercury, lead, antimony, arsenic, lithium, sodium, and potassium, as well as aryloxides, such as phenoxides or cresoxides of these metals. Nonmetallic elements having analogous derivatives may be used, for example in the form of esters of their acids, such as silicon, phosphorus, and boron, e.g., tetraethyl silicate, triethyl borate, and triethyl phosphate Among organic monoisocyanates which may be employed are included aryl, cycloalkyl, and alkyl derivatives, examples of which are phenyl, naphthyl, tolyl, cyclohexyl, butyl, and amyl monoisocyanates. Among polyisocyanates, such as di-isocyanates which may be used, there are included also aryl, cycloalkyl, and alkyl derivatives, examples of which include tolylene di-isocyanate, 3.3'-bitolylene-4.4'-di-isocyanate, 3.3'-dimethyldiphenylmethane-4.4'-di-isocyanate, diphenylmethane-4.4'-di-isocyanate, hexamethylene di-isocyanate, naphthalene-1.4-di-isocyanate, cyclohexylene-1.2-di-isocyanate, propylene and butylene di-isocyanates.

The reaction may be carried out simply and directly, with the starting material and the isocyanate both in the dry state. However, under certain conditions in which better contact is required, a nonreactive solvent or carrier may be employed.

The quantity of the reactants will in general be in accordance with stoichiometric considerations. Where a monoisocyanate is used, in general at least 1 mole of the monoisocyanate will be required for each integral value of $n$ in Equation 1 above. Where a di-isocyanate is used, at least 3 moles of the di-isocyanate will be required per 2 moles of the starting compound. However, it will be understood that variations may be made in these molar ratios without hindering the course of the reaction.

The reaction of the starting materials with the organic isocyanates to form the nitrogen containing intermediate compound will generally be initiated in the neighborhood of about 90° C., but depending upon the properties of the reactants, this temperature may be somewhat higher, extending to around 125° C. The reaction takes place satisfactorily without a catalyst, but if desired, a catalyst can be employed, generally in an amount of about 1% or less of the weight of the reactants. The catalyst not only serves to accelerate the reaction, but also to lower the reaction temperature at which the reaction readily occurs by approximately 10° to 15° C. Where a catalyst is employed it is preferably of the tertiary amine type, such as, for example, tribenzylamine, triethylamine, dimethylethanolamine, or N-methylmorpholine.

In the second stage of the reaction, which may be carried out in situ, reduction or conversion of the intermediate nitrogen containing compound takes place. This reduction is advantageously carried out using carbon monoxide, although any other reducing agent of this type may be used. The reaction takes place without a catalyst, although traces of unreacted starting materials of the MOR type may exert a catalytic effect, in accordance with Equations 3, 4, or 5 above. Depending on the nature of the radical R', a monoisocyanate or polyisocyanate will be regenerated.

It has been found that the amount of carbon monoxide added should be the stoichiometrical amount or a slight excess thereover. Use of excess carbon monoxide is detrimental in that it may lead to formation of undesired by-products. The carbon monoxide is preferably added under pressure ranging from about 60 to 175 pounds per square inch gauge, and at elevated temperatures, in the range of from about 150° to 250° C., preferably about 180° C. for good yields.

Illustrative of compounds which may be prepared by my novel process, but in no sense limited thereto, are: trimethyl aluminum, triethyl aluminum, tri-isopropyl aluminum, triethyl stibine, triphenyl stibine, tribenzyl borine, triethyl borine, phenyl lithium, tetramethyl silane, tetrabenzyl silane, tetraethyl silane, tetraphenyl silane, ethyl sodium, diethyl tin, triethyl titanium, and many others.

The net effect of the two reactions by removing $CO_2$ and adding CO is to remove oxygen and thus to convert MOR to MR. In the reactions expressed in the form:

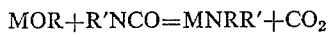

and

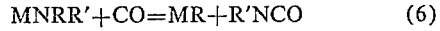   (6)

depending upon the nature of the radicals R and R' and the relative volatility of MR and MR', the second reaction may yield MR or MR', generally forming the more volatile compound.

If M has a valence higher than 1, as for example in aluminum alkoxides or phenoxides of the type $Al(OR)_3$, or borate esters of the type $B(OR)_3$, these reactions become, respectively,

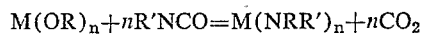

and

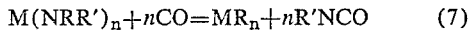   (7)

In this case $n$ is an integer from 1 to the largest number corresponding to the valence of M (which may be for example boron, in which latter case $n$ is 3). The metal or non-metal compound produced, which is represented by $MR_n$ may in fact be, assuming for example a valance of 3 for M, $MR_3$, $MR_2R'$, $MRR'_2$ or $MR'_3$, depending on the relative volatilities of these compounds, and it is possible, if the compound $M(OR)_3$ is a mixed alkoxide or ester of the formula $M(OR_1)(OR_2)(OR_3)$ in which $R_1$, $R_2$ and $R_3$ may be different radicals, although two or all 3 may be identical, to produce as the final product of reaction 7 a compound $MR''_3$ in which $R''$ may represent any (R), such as $R_1$, $R_2$, $R_3$ or $R'$ in any possible combination such as $M(R_1)(R_2)(R_3)$, $M(R_1)(R_2)(R')$, $M(R_2)(R_3)(R')$, $M(R_1)(R_3)(R')$, $M(R_1)_2$, $(R')$, $M(R_2)_2(R')$, $M(R_3)_2(R')$, $M(R_1)(R')_2$, $M(R_2)(R')_2$, $M(R_3)(R')_2$ etc.

Furthermore, if the isocyanate used for the first step is a polyisocyanate the amide formed, will, because of the polyfunctionality of the organic isocyanate, be for the reaction with MOR a linear or branched polymer, and in the case of $M(OR)_n$ where $n$ is an integer larger than 1, a polymer which in general is geometrically a planar or nonplanar highly branched and crosslinked polymer. However, I have found that regardless of the nature of the polymer which may be formed, which in the case of $M(OR)_n$ where $n$ is larger than 1, and the isocyanate is a polyisocyanate, is an infusible or extremely high melting solid, the Reaction 7, namely the reaction with CO occurs readily regenerating an isocyanate which may be identical with the initially used polyisocyanate or may be different, depending on which groups enter the finally formed MR₃.

An example is the reaction of ethyl borate with tolylene di-isocyanate to form a polymer, and this reaction may be represented by $$2mB(OC_2H_5)_3 + 3mCH_3C_6H_3(NCO)_2 \rightarrow$$
$$m[B_2(CH_3C_6H_3N_2)_3(C_2H_5)_6] + 6mCO_2\uparrow \quad (8)$$

When the polymer $m[B_2(CH_3C_6H_3N_2)_3(C_2H_5)_6]$ in which $m$ is a large number, corresponding to the degree of polymerization of said polymer, is reacted with carbon monoxide, CO, the following reaction occurs:

$$m[B_2(CH_3C_6H_3N_2)_3(C_2H_5)_6] + 6mCO \rightarrow$$
$$3mCH_3C_6H_3(NCO)_2 + 2mB(C_2H_5)_3 \quad (9)$$

The product, $B(C_2H_5)_3$, called triethylborine, has a much lower boiling point, 95° C., at 760 mm. pressure, than the tolylene di-isocyanate, about 120° C. at 10 mm. pressure and the products can easily be separated by fractional distillation.

Likewise if $M(OR)_n$ is, for example, and as an example only, taken as aluminum isopropoxide $$Al(O-iC_3H_7)_3$$

and the isocyanate is 3,3'-dimethyldiphenylmethane-4,4'-di-isocyanate, the polymer formed by such reaction will upon treatment with CO, yield the original 3,3'-dimethyldiphenylmethane-4,4'-di-isocyanate and aluminum tri-isopropyl. Since the boiling point of this di-isocyanate is extremely high (about 198° C. at 2 mm. absolute pressure) and the boiling point of aluminum tri-isopropyl is about 150° C. at atmospheric pressure the two substances are easily separated by fractional distillation, particularly at somewhat reduced pressures so that the aluminum alkyl boils at about 100° C., at which temperature the above di-isocyanate has an altogether negligible vapor pressure estimated to be much less than 0.1 mm.

The characteristic of all the amides formed by the primary reaction of $M(OR)_n$ with an isocyanate with the liberation of $CO_2$ is that M is bonded only to nitrogen, whether as a monomer or as a polymer, yielding in the case of $Al(OR)_3$

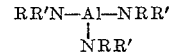

and if R' is polyfunctional, a structure is represented by

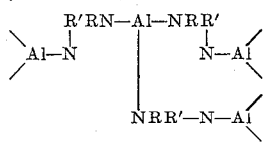

Similarly, in the case of $B(OR)_3$, the amide formed is

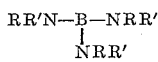

and if R' is polyfunctional, a structure represented by

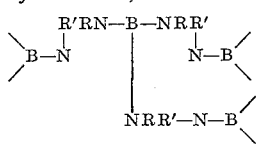

Analogous compounds are yielded by other metals such as zinc, magnesium, cadmium, lithium, potassium, sodium, etc.

Some of the substituted metal or non-metal amides or amines may have been produced by other methods, but whether produced by the reaction of a compound of the type represented by $M(OR)_n$ with an isocyanate, or otherwise, such amides or amines react with carbon monoxide, CO, to yield an isocyanate and a metal or nonmetal alkyl, aryl or alkaryl. For instance, it is known that diphenylamine can be reacted with sodium to produce $$NaN(C_6H_5)_2$$

sometimes referred to as sodiumdiphenylamine, or perhaps more properly as sodium diphenylamide in analogy to the commonly known sodium amide, $NaNH_2$, in which the two hydrogen atoms are replaced by phenyl groups. Sodium diphenylamide on reaction with carbon monoxide yields phenyl isocyanate and sodium phenyl.

The following examples serve to illustrate the invention, but it is not to be taken as limited thereto.

*Example 1*

50 g. of commercially available aluminum isopropoxide in the absence of air, under a dry nitrogen blanket was heated in a weighed mercury sealed flask with the stoichiometric amount of phenyl isocyanate, 97.2 g. to 95° C. when a violent reaction occurred with the liberation of copious amounts of carbon dioxide. The loss in weight was 36 grams, corresponding almost exactly to the reaction:

$$Al(i-C_3H_7O)_3 + 3C_6H_5NCO \rightarrow$$
$$3CO_2 + Al(N[i-C_3H_7][C_6H_5])_3$$

The product was a foamed tacky solid which was removed from the flask by a spatula and the total scrapings were placed on a stainless steel wire screen basket which was then placed in a gallon stainless steel autoclave which was closed, flushed with dry nitrogen, and carbon monoxide was added to a gauge pressure of 100 pounds per square inch. The temperature was raised to 180° C. and the pressure rose to about 150 p.s.i.g. and began to drop. Carbon monoxide was supplied from the cylinder to maintain the pressure at 150 p.s.i.g. until no further absorption occurred, while holding the temperature at 180° C. The autoclave was then cooled to room temperature, excess pressure was released and the autoclave was then connected to a condensing system so that the volatile contents could be distilled out and condensed.

Heat was applied, a slow current of dry nitrogen was bled in and the distillate was collected in a flask. Distillation began at 151° C. and the distillate from 151° C. to 155° C. was 21 g. This was determined to be essentially pure aluminum tri-isopropyl. The distillate coming over at 155–170° was 81 g. which was determined to be phenyl isocyanate, containing some aluminum tri-isopropyl. The 21 g. of distillate 151–155° C. was diluted with 100 g. of air-free dry n-heptane under nitrogen, and a portion of this solution was carefully decomposed with methanol and the gas liberated was collected and found to be propylene.

Aluminum tri-isopropyl thus prepared may be used as catalyst with titanium dichloride in n-heptane to polymerize ethylene to polyethylene.

*Example 2*

A similar experiment to Example 1 was run, using the same weight of reactants, but to the aluminum isopropoxide and phenyl isocyanate 1.0 g. of tribenzylamine was added as catalyst. On heating slowly the reaction with evolution of carbon dioxide began vigorously at 82° C. The loss in weight was 35.8 g. due to volatilization of carbon dioxide. The product was treated with carbon monoxide as before and yielded 21.4 g. of aluminum tri-isopropyl with the same properties as in Example 1.

Similar experiments with triethylamine as catalyst gave quite similar results.

*Example 3*

25 g. of anhydrous ethyl borate was reacted with tolylene di-isocyanate in slightly more than the stoichiometric amount (2 moles ethyl borate to 3 moles of tolylene di-isocyanate) 45 g., 0.5 g. of tribenzylamine was added as catalyst, and the charge was heated in the absence of air under dry nitrogen blanket as in Example 1. Reaction commenced at 88° C. with evolution of carbon dioxide. The product was a friable solid which was removed from the flask and reacted with carbon monoxide under the same conditions as Example 1. After cooling and releasing excess pressure, the volatile constituent was distilled out. It distilled at approximately 95° C. and was 15 g. of triethylborine.

To the residue in the autoclave 25 g. of anhydrous ethyl borate was added, and 0.5 g. of tribenzylamine and nitrogen blanket was heated slowly to 100° C. Carbon dioxide was evolved. The product without further treatment was then subjected to heating with carbon monoxide at 190° C. at 150 p.s.i.g. (measured cold), and after 40 minutes, the product was cooled, excess pressure released, and then the charge was distilled as before. 9 g. of triethylborine was obtained.

*Example 4*

Ethyl silicate, the ortho-ester of silicic acid, also known as tetraethoxysilane, $Si(OC_2H_5)_4$, was carefully fractionated in vacuum in a stream of dry nitrogen and only the middle 50% fraction reserved for use. A sample of this fraction boiled entirely at 167–169° C. at atmospheric pressure.

This purified ethyl silicate was reacted with phenyl isocyanate in the molar ratio of $Si(OC_2H_5)_4:C_6H_5NCO = 1:4$.

52.08 grams (¼ mole) of ethyl silicate was mixed with 119.12 grams (1 mole) of phenyl isocyanate, was warmed in a weighed 500 ml. flask provided with a reflux condenser and a gas inlet tube. The flask was set in an oil bath and heated slowly with feeding in a slow current of dry nitrogen until reaction occurred at 105° C. in the oil bath. Vigorous formation of carbon dioxide occurred. The temperature was maintained at 105–110° C. in the oil bath for one hour until reaction had apparently ceased. Upon cooling the loss in weight was found to be 42 grams, corresponding approximately to the reaction

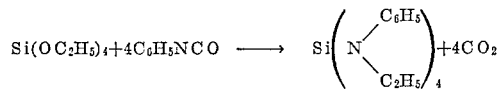

The product was then heated as in Example 1 with carbon monoxide in the autoclave at a pressure of 100 pounds per square inch, taking 10 minutes to reach 180° C., and then holding at 180° C. for 30 minutes, while maintaining the pressure at 100 pounds per square inch by admitting additional carbon monoxide. The autoclave was then cooled to room temperature, excess gas pressure was released, and the autoclave was then connected to a condensing system so that the distillable contents could be distilled out and condensed.

Heat was supplied, a slow current of dry nitrogen was bled in to assist vaporization. Distillation commenced at about 150° C. and was continued until the vapor temperature reached 175° C., when it began to drop. The total distillate was 102 grams. This was carefully refractionated from a 250 ml. all-glass distillation assembly with a fractionating head to yield 23.5 grams, boiling boiling point 157–169° C., which consisted essentially silane, $Si(C_2H_5)_4$ (density 20/4,0.77), and 58.3 grams, boiling point 157–169° C., which consisted essentially of phenyl isocyanate containing some tetra-ethylsilane (density 20/4,1.06). The phenyl isocyanate was used in a repetition of the same procedure, beginning with tetraethoxysilane, to give analogous results.

The overall reaction of tetraethoxysilane with phenyl isocyanate, followed by reaction with CO may be presented as:

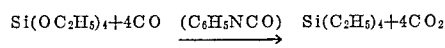

and is a means to convert the Si—O-alkyl bond to the Si-alkyl bond.

*Example 5*

Triethyl phosphite, B.P. 155–157° C., was reacted with phenyl isocyanate, as in Example 4, using in this case the molar ratio of triethyl phosphite:phenyl isocyanate=1:3. 55.4 grams of triethyl phosphite (⅓ mole) was reacted with 119.1 grams of phenyl isocyanate (1 mole) at 105° C. at which temperature carbon dioxide gas was copiously evolved. The product was reacted with carbon monoxide at 180° C. at 100 pounds per square inch pressure to yield triethylphosphine boiling point 130° C. The overall reaction of both steps may be represented by:

The yield of triethylphosphine was 27.1 grams, about 70% of theory.

*Example 6*

$Sb(OC_2H_5)_3$, boiling point 115–120° C., was prepared in accordance with MacKey, Jour. Chem. Soc., volume 95 (1909), p. 604. This was reacted with phenyl isocyanate in the molar ratio $Sb(OC_2H_5):C_6H_5NCO=1:3$.

42.8 grams of $Sb(OC_2H_5)_3$ (⅛ mole) was reacted as for Example 4, with 59.6 grams (½ mole) of phenyl isocyanate at 105° C., with copious evolution of carbon dioxide. The product was analogously reacted with carbon monoxide at 180° C. and 100 pounds per square inch for 1 hour, and the product was finally distilled to yield triethylstibine, $Sb(C_2H_5)_3$, yield 16.9 grams, about 50% of theory (density 1.30), boiling point 160° C.

*Example 7*

Tetraethyl titanate, $Ti(OC_2H_5)_4$, was prepared according to Bischoff and Adkins, Jour. Am. Chem. Soc., vol. 46 (1924), page 257. The boiling point was 132° C. at 5 mm. This was reacted with phenyl isocyanate in the molar ratio tetraethyl titanate:phenyl isocyanate= 1:4.

57 grams of tetraethyl titanate (¼ mole) was reacted with 119.2 grams of phenyl isocyanate (1 mole), as in Example 4 at 105° C., when copious evolution of carbon dioxide occurred. The product was analogously reacted with carbon monoxide at 180° C. and 100 pounds per square inch pressure for 1 hour, and the product was distilled in vacuum to remove the phenyl isocyanate at 100° C. (recovery 89 grams), and then at higher vacuum (5 mm.) to distill over titanium tetraethyl, boiling point 145–155° C., yield 16 grams, about 40% of theory.

As mentioned previously, the present process lends itself readily to continuous operation, particularly where the product $M(R)_n$ is vaporizable with recovery and reuse of the organic isocyanate, as indicated, for instance, in the foregoing Example 4. In general, continuous operation of the process would involve the use of an organic isocyanate having a higher boiling point than the final organo derivative of the metal or the nonmetal. This may be achieved by the use of higher molecular weight isocyanates or di-isocyanates. Thus, in the continuous operation of the procedures illustrated in Example 4, a charge of tolylene di-isocyanate is placed in an autoclave, the reaction allowed to proceed, by continuously adding ethyl silicate and pumping in carbon monoxide under pressure, e.g. at 110 pounds per square inch gauge, and at a temperature of 180° C., the reaction being so regulated that the residence time of the reactants is about 30 minutes. There results a continuous removal by distillation of the end product tetraethyl silane, together with $CO_2$ and CO, followed by condensation of the silane. The effluent carbon monoxide is purified to free it from carbon dioxide, and dried for recycling.

It will be understood that various other embodiments may be made without departing from the spirit and scope of this invention as defined in the appended claims.

I claim:

1. Process of preparing an organo derivative of the formula $M(R)_n$ from a corresponding oxygen linked compound of the formula $M(OR)_n$ wherein R is a hydrocarbon radical selected from the group consisting of alkyl, aryl, and aralkyl radicals, M is an element selected from the group consisting of metals which form hydrocarbon derivatives of the formula $M(R)_n$, boron, phosphorus, and silicon, and $n$ is an integer representing the valence of M, which comprises reacting said oxygen linked compound $M(OR)_n$ with an organic isocyanate selected from the group consisting of aryl, cycloalkyl, and alkyl isocyanates, at a temperature above about 90° C. until carbon dioxide is no longer formed, and then reducing the reaction mixture with carbon monoxide at a pressure above about 60 pounds per square inch gauge to form said organo derivative $M(R)_n$.

2. The process of claim 1 in which the organic isocyanate is a monoisocyanate.

3. The process of claim 1 in which the organic isocyanate is a di-isocyanate.

4. The process of claim 1 in which the reaction with the isocyanate takes place in the presence of an amine catalyst.

5. Continuous process for the preparation of a vaporizable organo derivative of the formula $M(R)_n$ from a corresponding oxygen linked compound of the formula $M(OR)_n$ wherein R is a hydrocarbon radical selected from the group consisting of alkyl, aryl, and aralkyl radicals, M is an element selected from the group consisting of metals which form hydrocarbon derivatives of the formula $M(R)_n$, boron, phosphorus, and silicon, and $n$ is an integer representing the valence of M, which comprises maintaining a charge of an organic isocyanate selected from the group consisting of aryl, cycloalkyl, and alkyl isocyanates, and continuously supplying the compound $M(OR)_n$ to react therewith and carbon monoxide reducing agent thereto at a pressure above about 60 pounds per square inch gauge at a temperature above about 90° C. and continuously removing carbon dioxide and excess carbon monoxide, and vapors of the compound $M(R)_n$.

6. Process of preparing an organo derivative of the formula $M(R)_n$ from a corresponding oxygen linked compound of the formula $M(OR)_n$ wherein R is a hydrocarbon radical selected from the group consisting of alkyl, aryl, and aralkyl radicals, M is an element selected from the group consisting of metals which form hydrocarbon derivatives of the formula $M(R)_n$, boron, phosphorus, and silicon, and $n$ is an integer representing the valence of M, which comprises reacting said oxygen linked compound $M(OR)_n$ at a temperature above about 90° C. with an organic isocyanate selected from the group consisting of aryl, cycloalkyl, and alkyl isocyanates to form an intermediate organic nitrogen containing derivative of M, and then reducing said nitrogen derivative with carbon monoxide at a pressure above about 60 pounds per square inch to form an isocyanate and said organo derivative $M(R)_n$.

7. Process of preparing an organo derivative of the formula $M(R)_n$ from a corresponding oxygen linked compound of the formula $M(OR)_n$, wherein R is a hydrocarbon radical selected from the group consisting of alkyl, aryl, and aralkyl radicals, M is an element selected from the group consisting of metals which form hydrocarbon derivatives of the formula $M(R)_n$, boron, phosphorus, and silicon, and $n$ is an integer representing the valence of M, which comprises reacting with said compound $M(OR)_n$ an organic monoisocyanate of the formula R'NCO wherein R' is a member selected from the group consisting of aryl, cycloalkyl, and alkyl radicals, at a temperature above about 90° C. to form an amino compound of the formula $M(NRR')_n$ wherein M, R and R' have the significance previously given, and then reducing said amino compound with carbon monoxide at a pressure above about 60 pounds per square inch gauge, to form an isocyanate and said derivative $M(R)_n$.

8. Process of preparing an organo derivative of the formula $M(R)_n$ from a corresponding oxygen linked compound of the formula $M(OR)_n$, wherein R is a hydrocarbon radical selected from the group consisting of alkyl, aryl, and aralkyl radicals, M is an element selected from the group consisting of metal which form hydrocarbon derivatives of the formula $M(R)_n$, boron, phosphorus, and silicon, and $n$ is an integer representing the valence of M, which comprises reacting with said compound $M(OR)_n$ an organic di-isocyanate of the formula $R'(NCO)_2$ wherein R' is a member selected from the group consisting of arylene, cycloalkylene and alkylene radicals, at a temperature above about 90° C. to form a polymeric nitrogen compound and then reducing said polymeric nitrogen compound with carbon monoxide at a pressure above about 60 pounds per square inch gauge to form a di-iso-cyanate and said organo derivative $M(R)_n$.

9. Process of preparing an organo derivative of the formula $M(R)_n$, wherein R is a hydrocarbon radical selected from the group consisting of alkyl, aryl, and aralkyl radicals, M is an element selected from the group consisting of metals which form hydrocarbon derivatives of the formula $M(R)_n$, boron, phosphorus, and silicon, and $n$ is an integer representing the valence of M, which comprises reducing an organic amino compound of the formula $M(NRR')_n$ wherein R' is a radical selected from the group consisting of aryl, cycloalkyl, and aryl radicals with carbon monoxide at a pressure above about 60 pounds per square inch gauge, to form said organo derivative $M(R)_n$ and an isocyanate.

10. Process of preparing aluminum tri-isopropyl which comprises reacting aluminum isopropoxide with phenyl isocyanate and then reducing the reaction mixture with carbon monoxide to form the aluminum tri-isopropyl and regenerate the phenyl isocyanate.

11. Process of preparing borines which comprises reacting an alkyl ester of boric acid with an organic isocyanate selected from the group consisting of aryl, cycloalkyl, and alkyl isocyanates and then reducing the reaction mixture with carbon monoxide to form the corresponding borine.

12. Process of preparing silanes which comprises reacting an alkyl ester of silicic acid with an organic isocyanate selected from the group consisting of aryl, cycloalkyl, and alkyl isocyanates and then reducing the reaction mixture with carbon monoxide to form the corresponding silane.

13. The process of claim 1 in which the reaction with the organic isocyanate takes place at a temperature between about 90° C. and about 125° C.

14. The process of claim 1 in which the carbon monoxide is introduced at a pressure between about 60 and 175 pounds per sq. in gauge.

15. The process of claim 1 in which the reduction step takes place at a temperature between about 150° and 250° C.

References Cited in the file of this patent

FOREIGN PATENTS

| 1,013,933 | France | May 14, 1952 |
| 717,408 | Great Britain | Oct. 27, 1954 |

OTHER REFERENCES

Michael: "Berichte der Deutschen Chemischen Gesellschaft," pages 22–49. vol. 38 (January 1905).